Jan. 6, 1959
C. N. BERGER
2,867,056
TREE BRANCH PROP
Filed Dec. 5, 1956
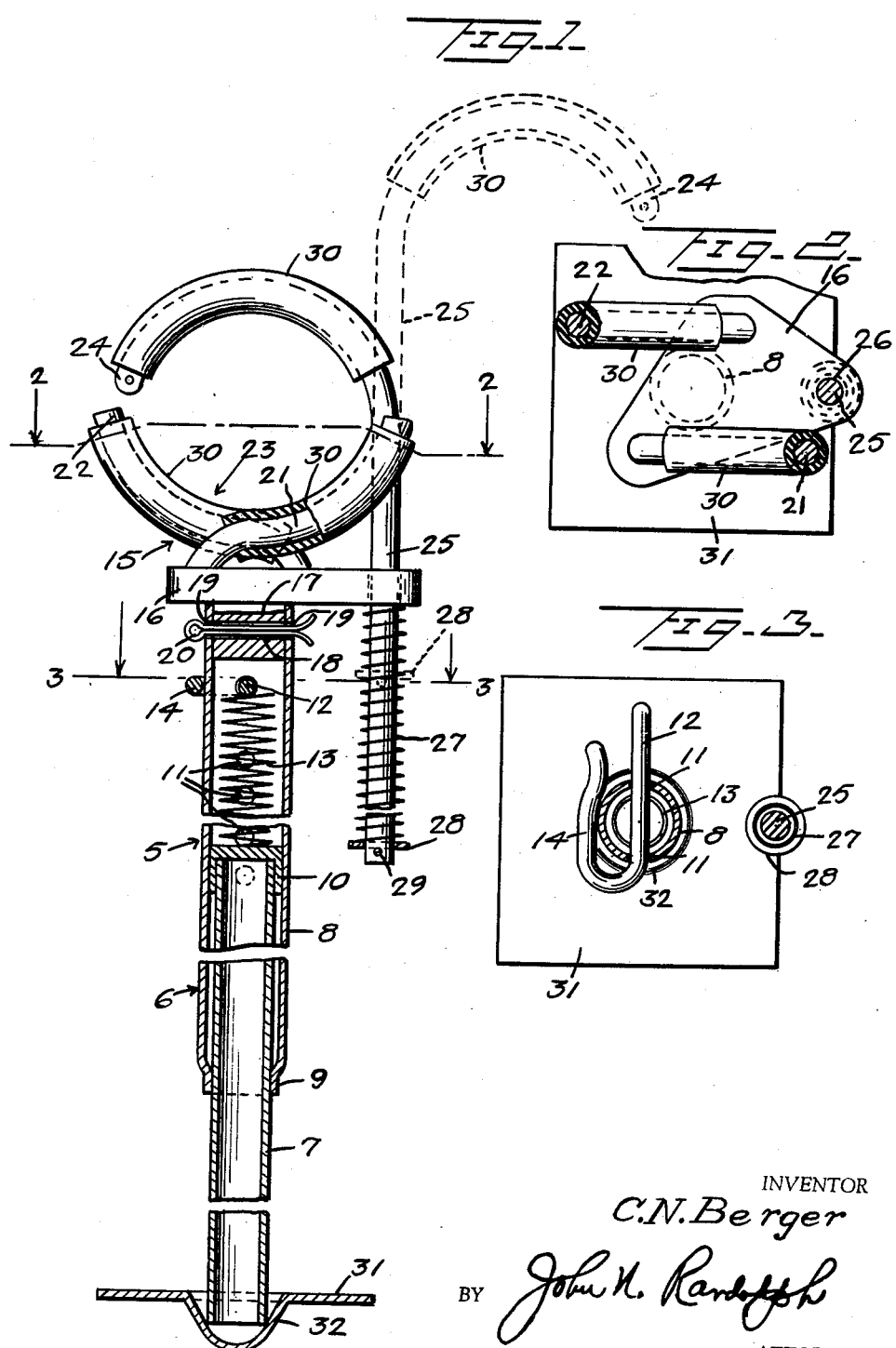
INVENTOR
C. N. Berger
BY John N. Randolph
ATTORNEY

United States Patent Office 2,867,056
Patented Jan. 6, 1959

2,867,056

TREE BRANCH PROP

Charles N. Berger, Easton, Pa.

Application December 5, 1956, Serial No. 626,494

3 Claims. (Cl. 47—43)

This invention relates to an adjustable, yieldably extensible prop for tree branches and has for its primary object to provide a prop for yieldably supporting a fruit laden tree branch to prevent the branch from being broken by the weight of the fruit and to prevent jarring the branch in windy or stormy weather and which would tend to dislodge the fruit therefrom and possibly break the branch.

Still another object of the invention is to provide a tree branch prop having means for releasably clamping the prop to the tree branch to prevent the branch becoming dislodged from the prop in windy and stormy weather to thus protect the branch from breakage by sudden and violent release of the branch from a raised position supported by the prop and which in addition prevents loss of the fruit.

Still a further object of the invention is to provide a branch prop having novel means for adjusting the length of the prop and for varying the tension thereon tending to extend the prop, for adapting the prop to tree branches located at different elevations and of various sizes and weights.

Still another object of the invention is to provide a tree branch prop the lower end of which may be supported on an inclined surface and on soft ground and in a manner to enable the prop to swing about the lower end thereof as a fulcrum so that the upper end of the prop may follow swinging movement of a tree branch to which the prop is connected.

Various other objects and advantages of the invention will hereinafter become more fully apparent from the following description of the drawing, illustrating a presently preferred embodiment thereof, and wherein:

Figure 1 is a fragmentary side elevational view partly in vertical section of the tree branch prop;

Figure 2 is a fragmentary horizontal sectional view, taken substantially along a plane as indicated by the line 2—2 of Figure 1, and Figure 3 is a horizontal sectional view, taken substantially along a plane as indicated by the line 3—3 of Figure 1.

Referring more specifically to the drawing, the tree branch prop in its entirety is designated generally 5 and includes an elongated post or standard, designated generally 6, and comprising a lower section 7 and an upper section 8. The upper standard section 8 is of tubular form and the lower standard section 7 is likewise preferably tubular to reduce the weight of the prop 5. The upper section 8 has an internal diameter greater than the external diameter of the section 7 and is provided with a restricted lower end 9 sized to fit relatively close around a part of the standard section 7 and in which said standard section is slidably disposed. A cap 10 is mounted on the upper end of the standard section 7 and has a relatively close fitting sliding engagement in the section 8 for cooperation with the restricted portion 9 to retain the sections 7 and 8 in alignment, to prevent any rocking movement of the section 8 relative to the section 7 and to enable the section 8 to slide freely on the section 7.

The upper portion of the section 8 is provided with a plurality of pairs of openings 11, the openings of each of which pairs are disposed in alignment. The openings of the different pairs are disposed in longitudinally spaced relation to one another, as seen in Figure 1. A pin 12 is selectively mounted in the openings of any of the pairs of openings 11 to provide an abutment for the upper end of a compression spring 13, the lower end of which seats on the top of the cap 10. The pin 12 has a turned back end forming a spring clip 14 which yieldably engages around a part of the outer side of the section 8 to releasably retain the pin 12 in an applied position, as best seen in Figure 3.

The prop 5 includes a head, designated generally 15, and which includes a substantially flat plate 16 having a boss 17 which depends from a portion of the underside thereof and which fits detachably in the upper end of the post section 8. The boss 17 has a transverse bore 18 which aligns with openings 19 in the upper portion of the section 8 for receiving a cotter pin 20, to detachably secure the head 15 on the post or standard 6. A pair of fork arms 21 and 22 are fixed to and extend upwardly from the upper side of the plate 16 and are curved so as to extend upwardly in opposite directions. The arms 21 and 22 are laterally spaced relative to one another, as best seen in Figure 2, and are arranged to form an upwardly opening substantially semicircular fork or yoke 23, as seen in Figure 1. A hook 24, forming a part of the head 15, is provided with an elongated straight shank 25 which extends downwardly from one end of the hook 24 and slidably through a guide opening 26 formed in a portion of the plate 16. A compression spring 27 is loosely disposed around the lower portion of the hook shank 25 and has its upper end bearing against the underside of the plate 16 and its lower end bearing on a washer 28 which is detachably supported on the lower portion of the shank 25 by a pin 29 which extends through said shank, beneath the washer. The shank 25 is slidably and swivelly disposed in the guide opening 26 and is positioned thereby so that the hook 24 can be disposed directly over the fork or yoke 23, as seen in full lines in Figure 1, and will be disposed in a plane between the planes of the two fork arms 21 and 22, due to the disposition of the opening 26 relative to the fork arms 21 and 22, as seen in Figure 2. A substantial portion of each of the fork arms 21 and 22 and the hook 24 is enclosed in a protective sleeve 30 of a cushioning material such as rubber.

The prop 5 also includes a base plate 31 having a central depression 32 in which the lower end of the standard section 7 seats and relative to which the standard can rock.

From the foregoing it will be apparent that the hook 24 can be turned outwardly with respect to the fork or yoke 23, as seen in dotted lines in Figure 1, and the fork or yoke can then be positioned to engage under a tree branch, not shown. The hook 24, while displaced upwardly as seen in dotted lines in Figure 1, can then be rotated through a half circle to a position over the yoke or fork 23 and over a branch which is engaging therein. The spring 27 will then urge the hook 24 downwardly so that it will engage over a part of the upper portion of the branch and between parts thereof engaged by the fork arms. The head 15 is thus clamped resiliently to the branch. The protector sleeves 30 will prevent the arms and hook from coming in direct contact with the tree branch to prevent chafing of the branch. It will be understood that the post or standard 6 would have been previously adjusted, by adjustably positioning the pin 12, to a correct length depending upon the elevation and weight of the branch to be supported by the prop 5, so that the prop will yieldably support the branch including the weight of fruit borne thereby. Since the head 15 is effectively clamped to the branch by the yoke 23 and hook 24, swinging of the branch in the wind will not result in the prop becoming disengaged therefrom. When this occurs, the lower end of the post 6 will rock in the plate socket 32 and said post will be extended and retracted as the branch portion engaged by the head moves away from or toward the base plate 31. It will also be apparent that the base plate 31 can support the lower end of the post on an inclined surface or on soft ground without becoming embedded therein. The post or standard 6 may be of any desired length depending upon the height of a branch to be supported by the prop 5.

Various modifications and changes are contemplated and may obviously be resorted to, without departing from the function or scope of the invention as hereinafter defined by the appended claims.

I claim as my invention:

1. A tree branch supporting prop comprising an elongated extensible standard, a head connected to the upper end of said standard including means for detachably clamping said head to a tree branch for positioning the standard therebeneath, and means carried by the standard and yieldably urging the upper end of the standard toward an extended position whereby said head is yieldably supported by the standard, said head including a plate mounted on the upper end of the standard, a pair of fork arms fixed to and extending upwardly from the plate, said fork arms having portions disposed in cross relation to one another and being curved to form an upwardly opening fork, a hook having an elongated shank extending slidably through the plate and swively mounted therein for positioning said hook over the fork or to one side thereof, and spring means carried by the hook shank and urging the hook and shank downwardly, said fork and hook combining to form said yieldable clamping means.

2. A tree branch prop as in claim 1, said fork arms being disposed in spaced apart substantially parallel relation to one another, and said hook being disposed, in one position thereof, above the fork and in a plane parallel to and between the planes of said fork arms.

3. A tree branch supporting prop comprising an elongated extensible standard, a head connected to the upper end of the standard and adapted to be detachably clamped to a tree branch for positioning the standard therebeneath, said head having an upwardly opening fork and a downwardly opening hook disposed above and yieldably urged toward the fork and between which fork and hook the tree branch is adapted to be detachably clamped, means carried by the standard and yieldably urging the upper end of the standard toward an extended position and whereby the head is yieldably supported by the standard, and a base plate adapted to be disposed on the ground and having an upwardly opening socket in which the lower end of the standard is supported for rocking movement.

References Cited in the file of this patent

UNITED STATES PATENTS

| | | |
|---|---|---|
| 1,021,650 | Worthington | Mar. 26, 1912 |
| 1,179,209 | More | Apr. 11, 1916 |
| 1,227,105 | Barnes | May 22, 1917 |
| 2,296,217 | Maloney | Sept. 15, 1942 |
| 2,425,893 | Molitor | Aug. 19, 1947 |